Oct. 15, 1935. S. J. BLAKE 2,017,392
VEHICLE STOP
Filed Nov. 29, 1932 5 Sheets-Sheet 3
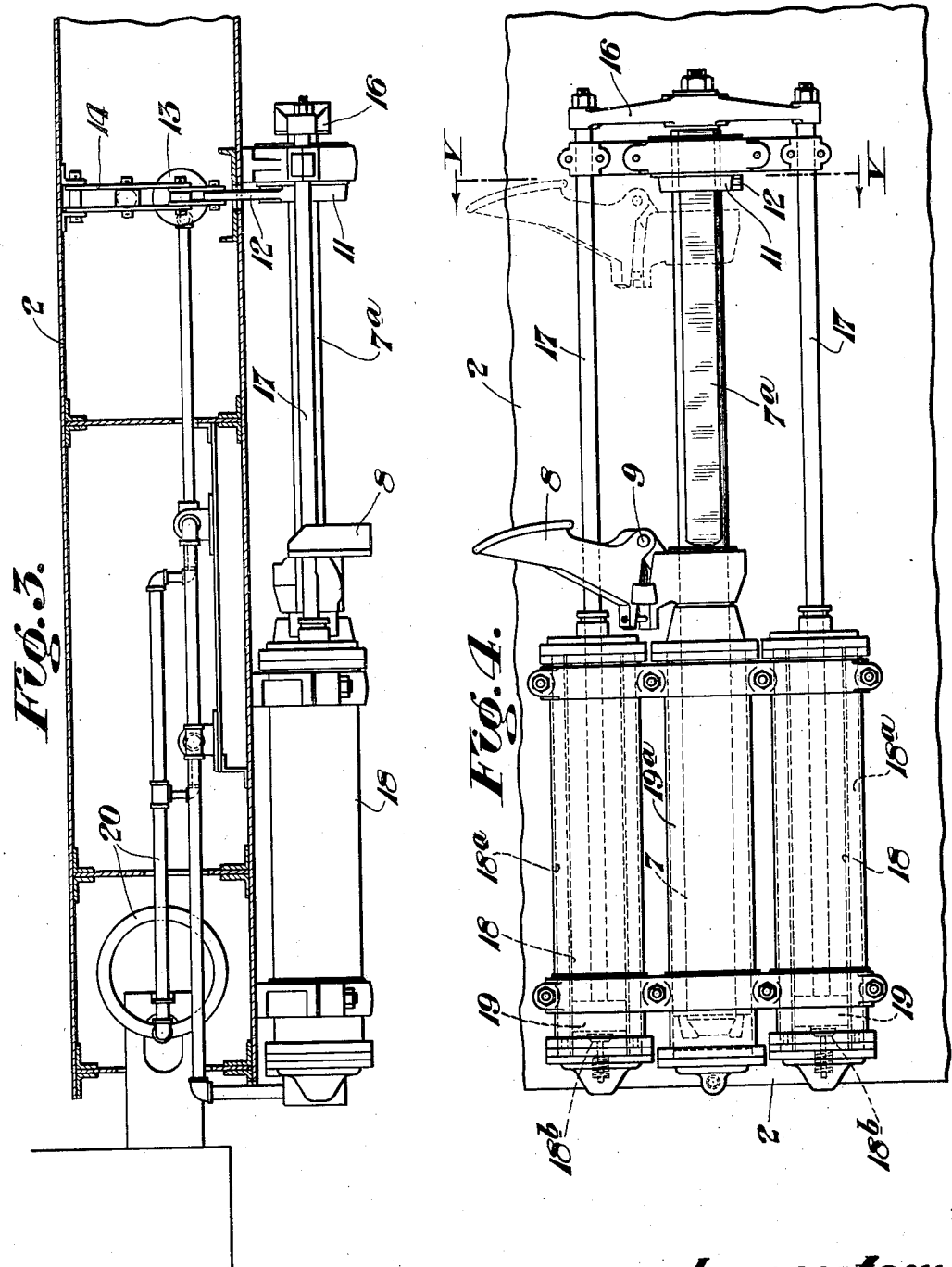
Inventor:
SHERMAN J. BLAKE,
by Usina & Hauber
his Attorneys.

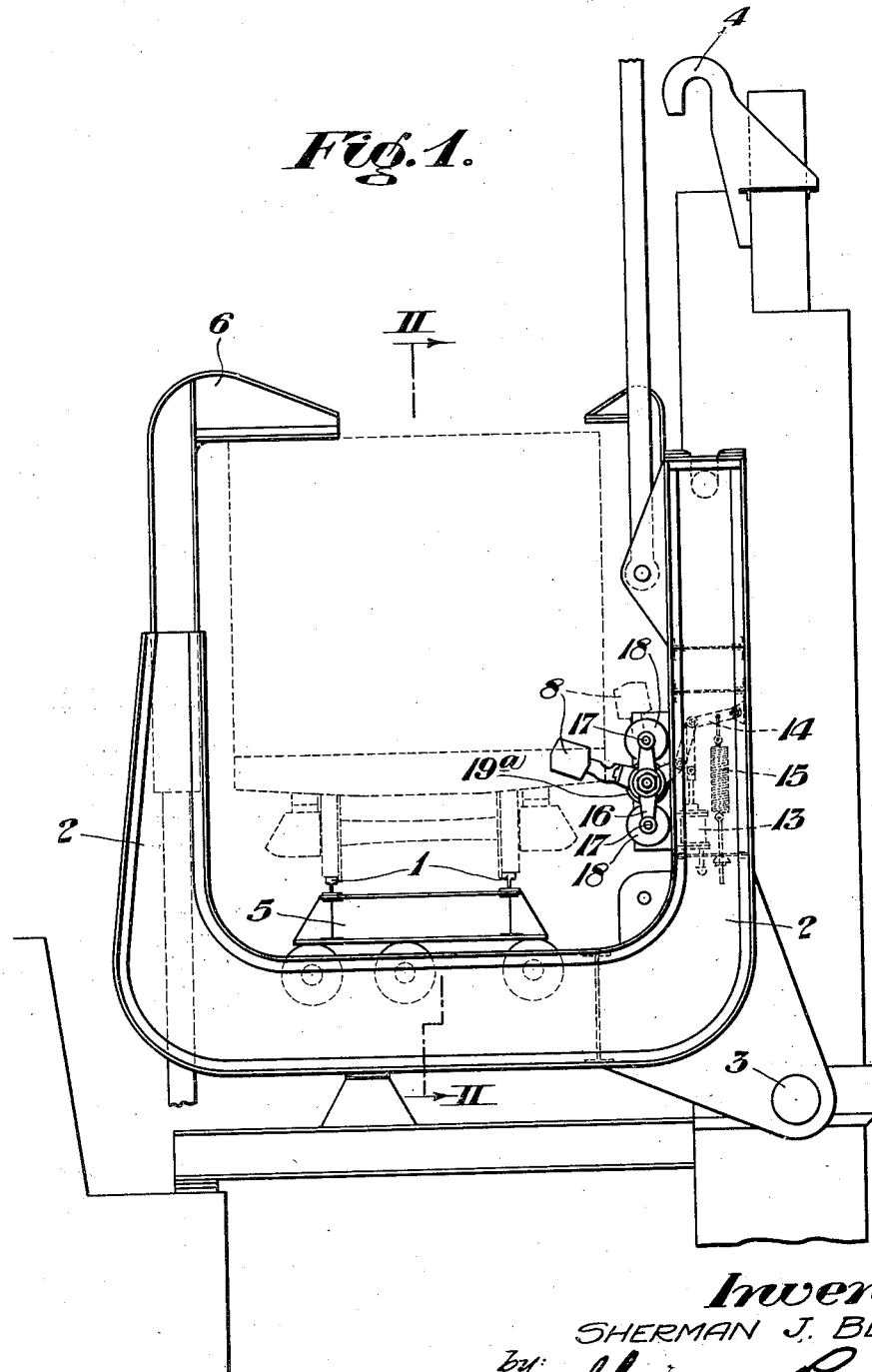

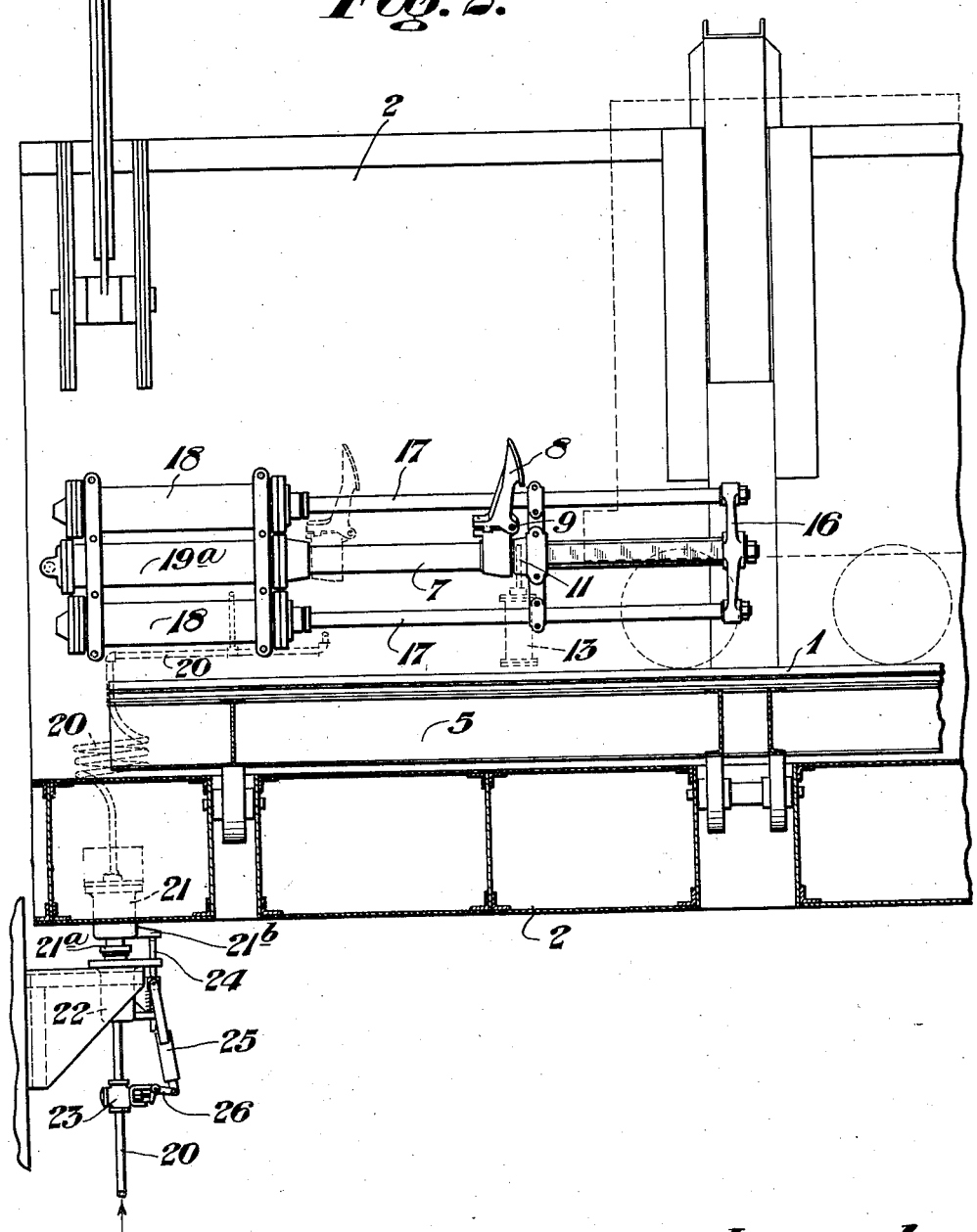

Oct. 15, 1935.   S. J. BLAKE   2,017,392
VEHICLE STOP
Filed Nov. 29, 1932   5 Sheets-Sheet 4
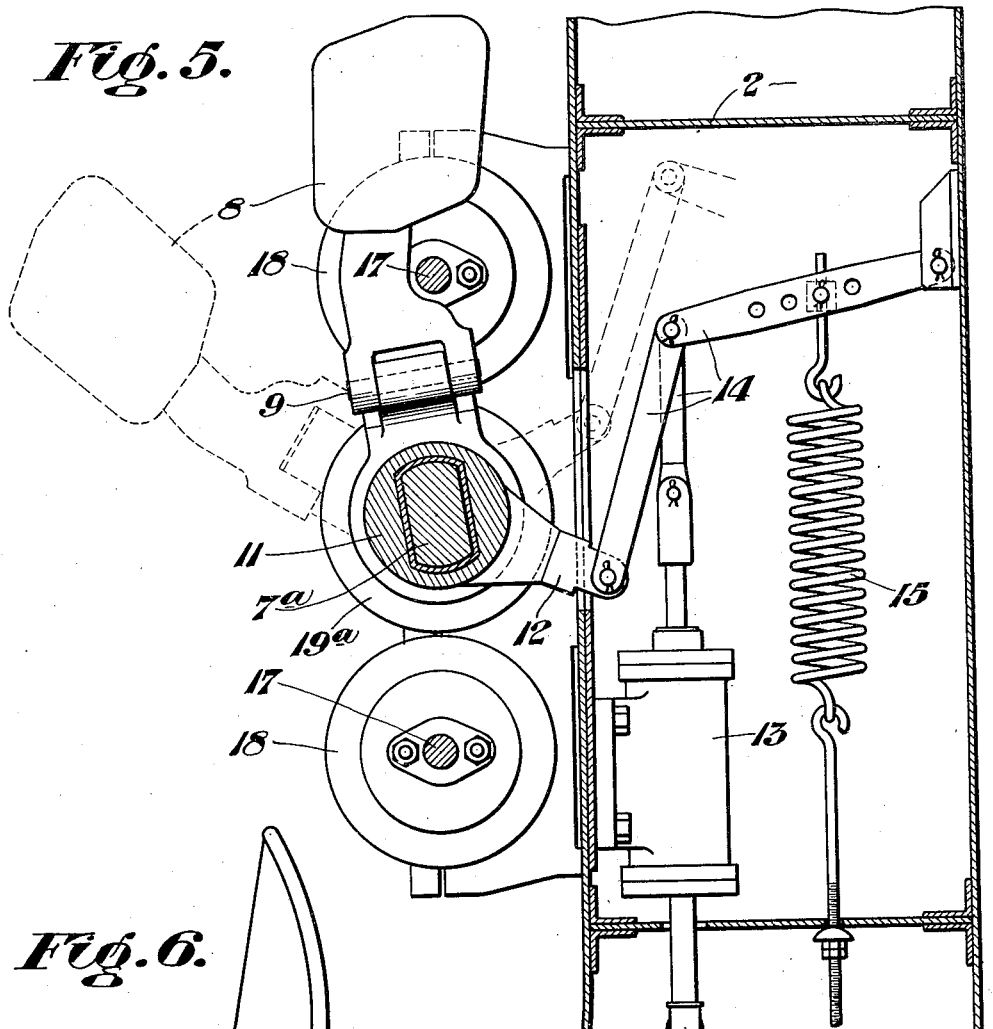
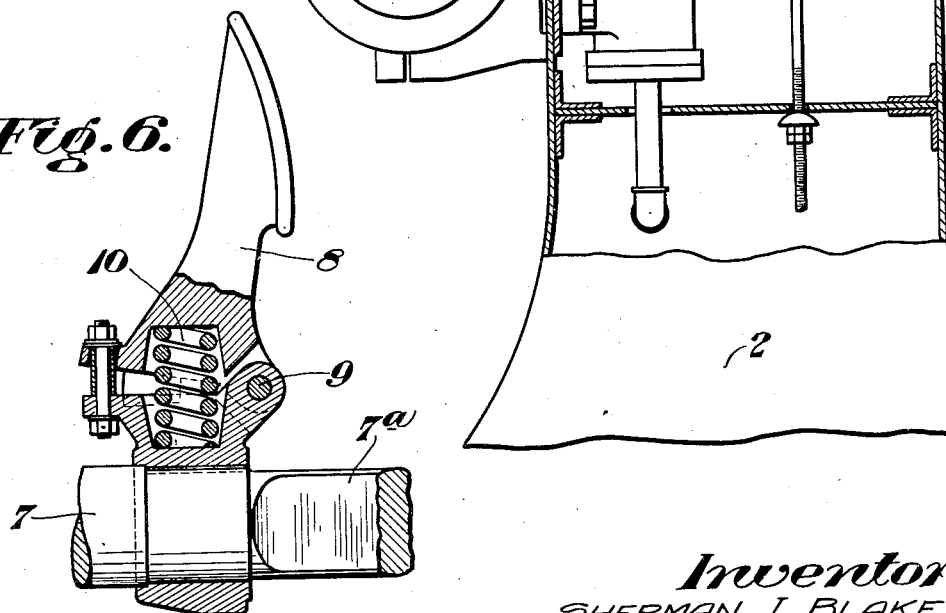
Inventor:
SHERMAN J. BLAKE,
by Nina & Lauber
his Attorneys.

Oct. 15, 1935.  S. J. BLAKE  2,017,392
VEHICLE STOP
Filed Nov. 29, 1932  5 Sheets-Sheet 5
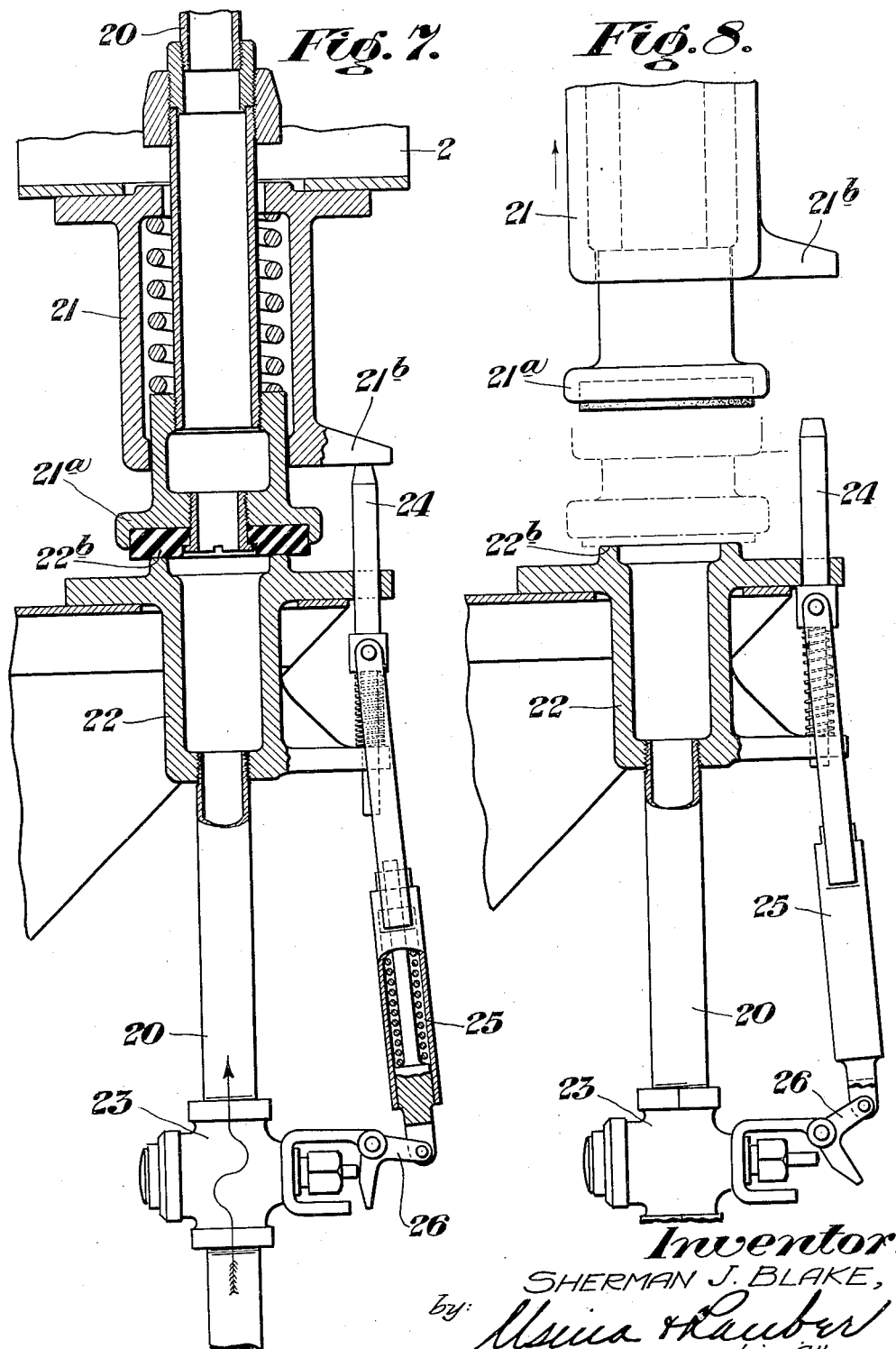
Inventor:
SHERMAN J. BLAKE,
by: his Attorneys.

Patented Oct. 15, 1935

2,017,392

UNITED STATES PATENT OFFICE 2,017,392

VEHICLE STOP

Sherman J. Blake, Conneaut, Ohio

Application November 29, 1932, Serial No. 644,857

4 Claims. (Cl. 214—123)

This invention generally relates to car dumpers of the type which is adapted to lift loaded cars and tilt them to discharge their contents. The inventor's primary object is to provide a means for stopping cars in registration with the lifting apparatus of such dumpers. Other objects may be gathered from the following disclosure of an exemplary form of the invention.

Referring to the drawings:

Figure 1 is an end elevation of the invention in use.

Figure 2 is a cross-section taken from the line II—II in Figure 1.

Figure 3 is an enlarged top plan of the invention as shown in Figure 2.

Figure 4 is a side elevation of Figure 3.

Figure 5 is a cross-section from the line V—V in Figure 4.

Figure 6 is a enlarged detail from Figure 4.

Figure 7 is an enlarged detail from Figure 2.

Figure 8 illustrates the action of the detail in Figure 7.

To simplify the disclosure, these drawings do not completely illustrate a car dumper. They do show a track section 1 which is lifted by a cradle 2 until the latter's pivoting pins 3 register with elevated bearing hooks 4, the cradle tilting about the axis of these hooks. This track section is mounted on a carriage 5 so the cars may be moved to the side of the cradle prior to operation of the holding clamps 6. It is to be assumed that the track section 1 registers with tracks which carry cars to and from the dumper.

Heretofore the cars have been stopped at the proper place on the track section 1 by manual operation of their brakes. This was done by men riding the cars, and it is easily understood that they were in imminent danger of being thrown to the ground or into the cars.

In the present instance, a shaft 7 is arranged parallel to the lifting track section 1 and adjacent the point where the forward end of a car should be when properly placed for operation of the dumper. This shaft carries a right angularly projecting arm 8 adjacent its middle. Preferably, the end portion of this arm is hinged on a shear-pin 9, and works against a compression spring 10 to provide resiliency.

The shaft 7 has a flattened portion 7ª which passes through a member 11 suitably shaped to provide a sliding bearing. This member 11 may be turned by means of a lever 12 connected to the plunger of an air cylinder 13 by a linkage 14. A spring 15 fixed to this linkage urges the member 11 to a position where the shaft 7 will hold the arm 8 substantially upright.

The end of the portion 7ª of the shaft 7 is fixed to a cross-head 16 which thus connects it to shafts 17 which project from a pair of shock absorbing cylinders 18. These cylinders are constructed in the usual manner, the shafts 17 being those driving the conventional pistons 19 which act on fluid in the cylinders, which is forced through orifices to chambers 18ª. The shaft 7 fits in an air cylinder 19ª so that it may be returned when displaced. The shock absorbing cylinders are constructed for easy returning motion, the fluid being free to return through check valves 18ᵇ.

When it is desired to stop an oncoming car on the lifting track section 1, the air motor 13 is operated to turn the member 11 so the shaft 7 is rotated and the arm 8 thrown to a substantially horizontal position where it is in the path of the oncoming car. The arm will be engaged by the car and the resulting shock absorbed by the shock absorbing means described. In case the car is extremely heavy air may be admitted to the cylinder 19ª so that the arm 8 is more firmly held against displacement.

In the event the car is pushed forward too violently, the shear-pin 9 will let go and allow it to pass without putting any of the apparatus out of commission. Reinsertion of a new shear-pin may be easily done. The spring 10 acts to some extent as a shock absorber and further serves to ease the load on the shear-pin 9. After the car is stopped the air is released from the motor 13 so the spring 15 may return the arm 8 to its vertical position.

The various parts above described may be mounted on the dumper structure in any suitable manner. This may be done by attachment to the cradle 2 which raises during dumping of the car. It follows that some flexible means must be provided to power the air motors 13 and 19. This may be conveniently done through one or more compressed air lines 20 including separable portions 21 and 22 which register when the cradle and tracks are in their car receiving and discharging positions. Preferably, each separable portion 21 includes a resiliently mounted rubber faced member 21ª which cooperates with a seat 22ᵇ of the portion 22. Also, a valve 23 should be interposed in the line and automatically closed when the portions separate. This may be done by providing the portion 21 with a projection 21ᵇ which presses against a spring urged push-rod 24 connected through a resilient arm 25 fixed to a bell-crank 26. Assuming the valve 23 to be an ordinary whistle valve, this bell-crank 26 may be suitably mounted to press against its plunger and thus establish communication through the line when the parts are registered.

The various valves controlling the two air motors may be electromagnetic and interconnected with the electric system of the dumper if the latter is of any of the electrical types. If this is done in the proper manner the operation of the new car stop may be automatically effected. It is also desirable that the motor 13, which swings the arm 8 into its engaging position, be automatically operated by the approach of a car to its stopping point.

Although the car stop forming the essence of this present invention has been described throughout as associated with a car dumper, it is to be understood that it might have other useful applications. It is not intended, therefore, that the following claims be all limited exactly to the specific form disclosed, this having been done in accordance with the patent statutes and not for purposes of limitation.

I claim:

1. The combination of a vehicle passage, a reciprocative and rotative shaft substantially paralleling said passage, shock absorbing means arranged in connection with said shaft, an arm fixed on said shaft and stationary means in sliding rotative association with said shaft.

2. The combination of a reciprocative and rotative shaft, a projecting arm fixed on said shaft, rotative means in sliding engagement with said shaft, shock absorbing means arranged in connection with said shaft and means for returning said shaft when displaced by shock transmitted through said projecting arm.

3. The combination of a reciprocative and rotative shaft, a projecting arm fixed on said shaft and including a resiliently hinged portion, a shear-pin mounting said portion, a member encircling said shaft for free sliding movement and mutually dependent rotation, means for rotating said member, shock absorbing means arranged in connection with said shaft and means for returning said shaft when in displaced position.

4. The combination of fixed and movable track sections, a car stop mounted for movement with said movable section and including an operating air motor, a line for connecting said air motor to a suitable air source, separable air conducting portions interposed in said line, one of said portions being carried by said movable section and both being constructed and arranged for substantially air-tight registration when said sections are in registration, and means for preventing the escape of air through at least one of said portions when they are respectively separated.

SHERMAN J. BLAKE.